United States Patent [19]

Cilano

[11] Patent Number: 5,462,497
[45] Date of Patent: Oct. 31, 1995

[54] CONTROLLABLE PARALLEL AXIS DIFFERENTIAL

[76] Inventor: Joseph E. Cilano, 6595 N. Lake Rd., Bergen, N.Y. 14416

[21] Appl. No.: 299,494

[22] Filed: Sep. 1, 1994

Related U.S. Application Data

[63] Continuation-in-part of Ser. No. 282,622, Jul. 29, 1994, which is a continuation-in-part of Ser. No. 58,480, May 6, 1993, Pat. No. 5,415,599.

[51] Int. Cl.$^6$ ........................................................ F16H 1/42
[52] U.S. Cl. ............................................................. 475/252
[58] Field of Search ................................... 475/249, 250, 475/252

[56] References Cited

U.S. PATENT DOCUMENTS

| | | | |
|---|---|---|---|
| 5,122,101 | 6/1992 | Tseng | 475/252 |
| 5,244,440 | 9/1993 | Ichiki et al. | 475/252 |

*Primary Examiner*—Edward K. Look
*Assistant Examiner*—James A. Larson
*Attorney, Agent, or Firm*—Jaeckle, Fleischmann & Mugel

[57] ABSTRACT

A parallel-axis differential comprising a housing rotatable in forward and reverse drive directions about a common axis of rotation of a pair of drive shafts, first and second side gears positioned within the housing for receiving ends of the respective drive shafts for rotation therewith about the common axis, first and second pairs of planet gears positioned within the housing in engagement with the side gears for rotation about respective axes that extend parallel to the common axis of rotation, each of the pairs of planet gears including a leading planet gear member and a following planet gear member, a first toggle having first and second bearing surfaces and being mounted in the housing between the first and second pairs of planet gears, the first bearing surface of the first toggle rotationally supporting the leading member of the first pair of planet gears, the second bearing surface of the first toggle rotationally supporting the following member of the second pair of planet gears, the first toggle being pivotable about a first pivot axis that extends parallel to the planet gear axes for transmitting a gear reactionary force between the leading and following members of the first and second pairs of planet gears; and, an apparatus for controlling the first toggle and for controlling the amount of the gear reactionary force transmitted between the leading and following members of the first and second pairs of planet gears.

13 Claims, 19 Drawing Sheets

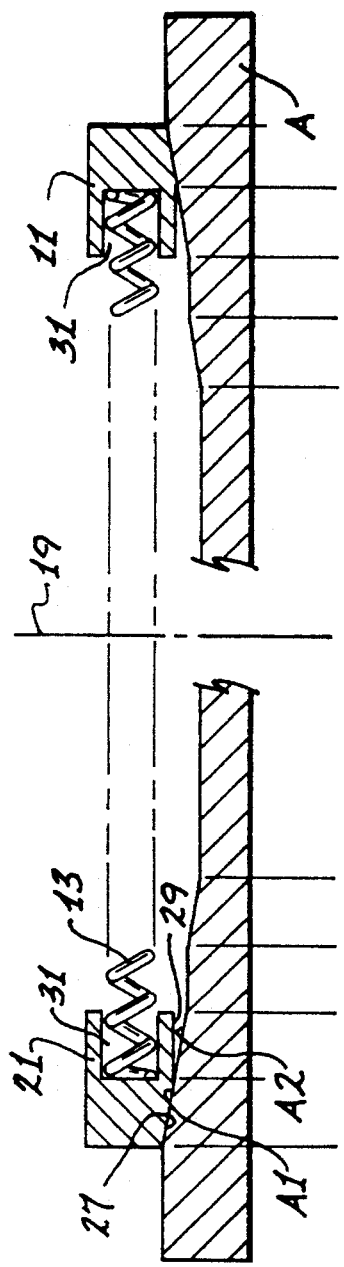
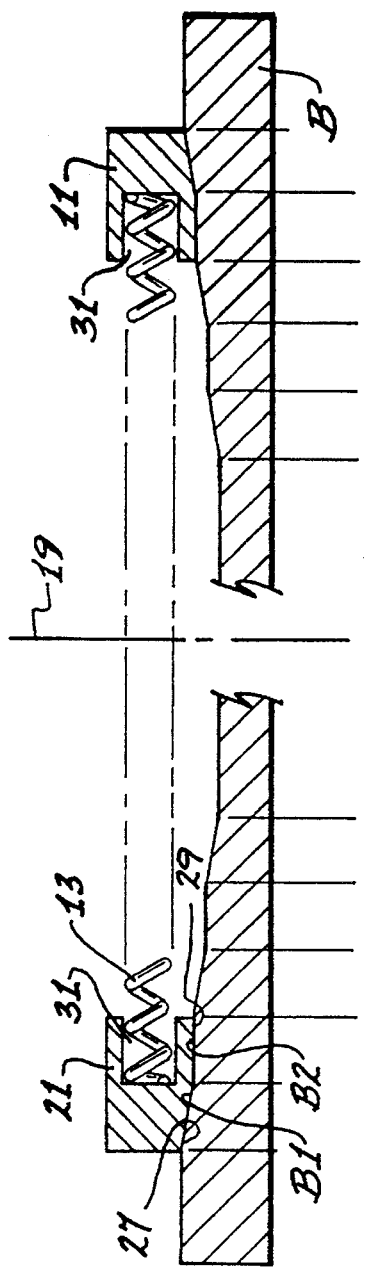
Fig. 9A
Fig. 9B

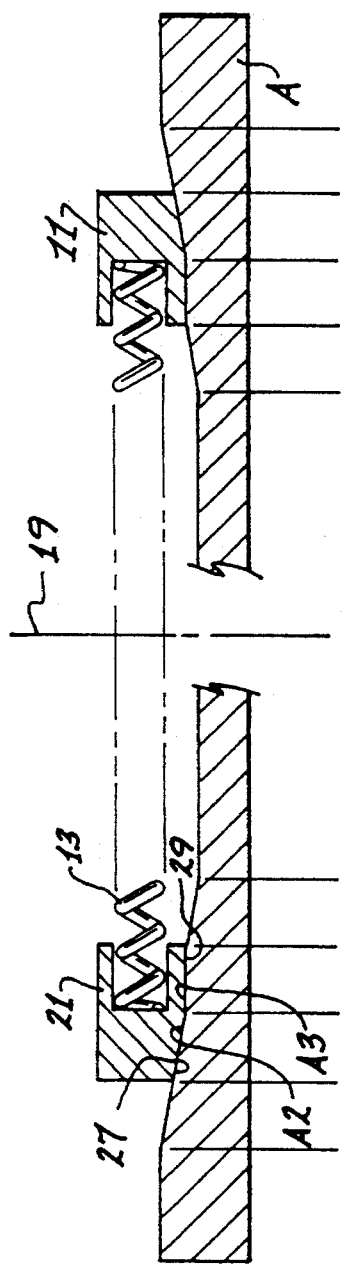
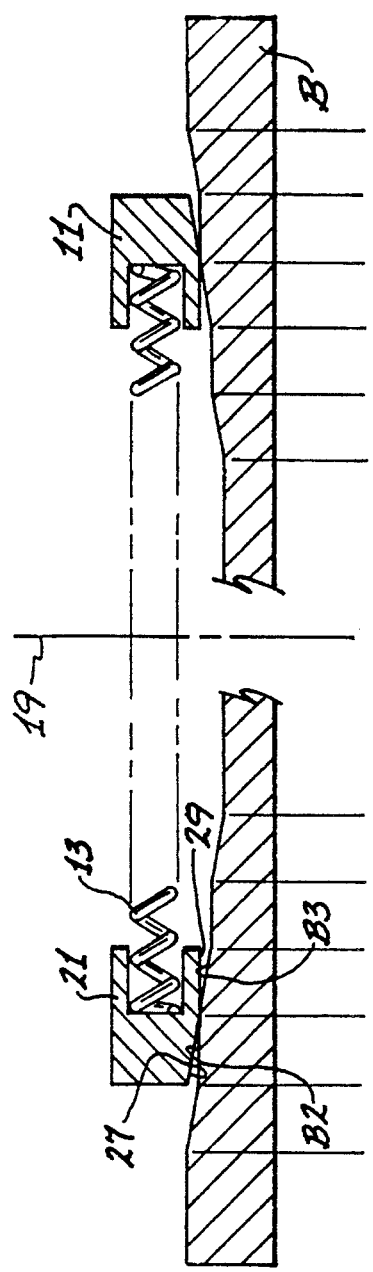
Fig. 11A
Fig. 11B
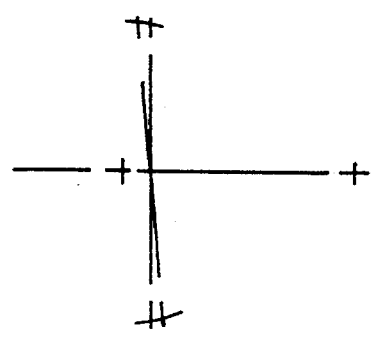
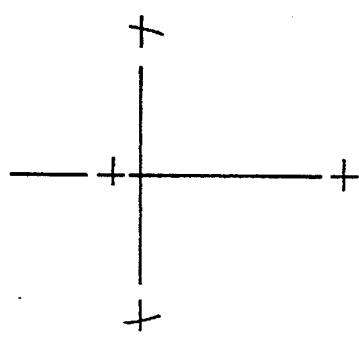

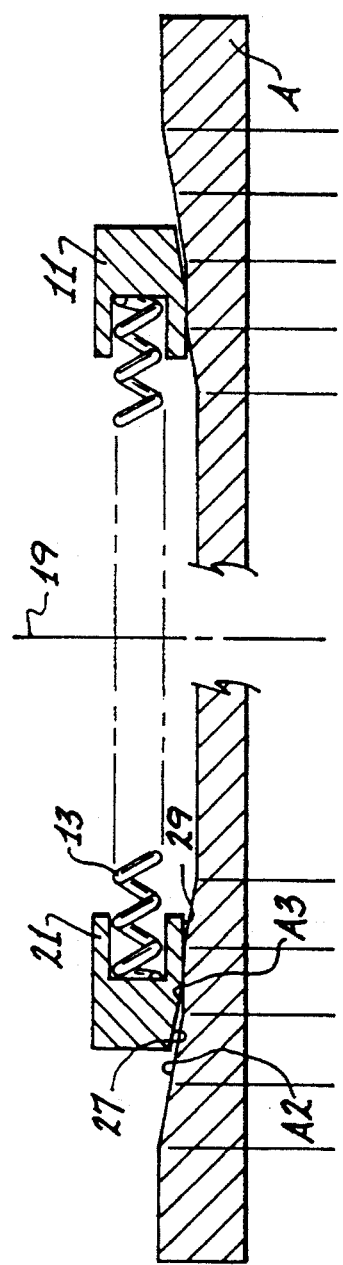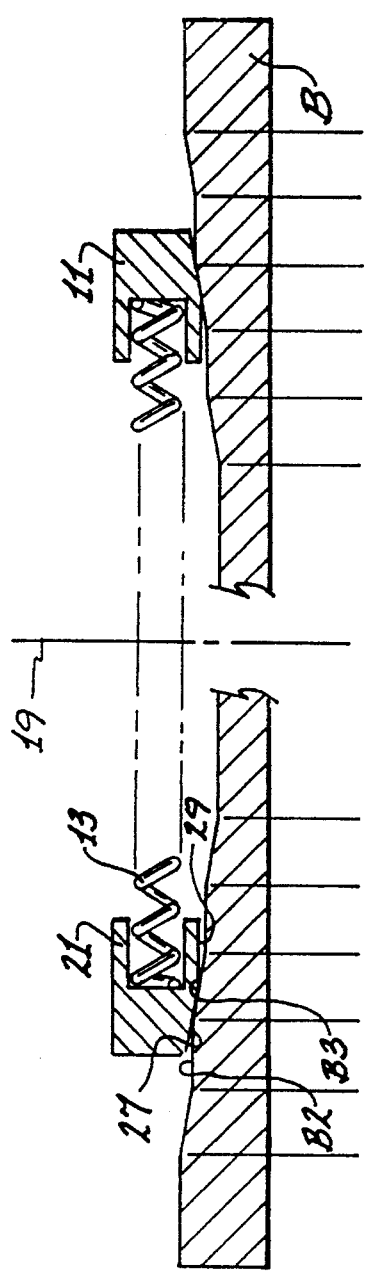

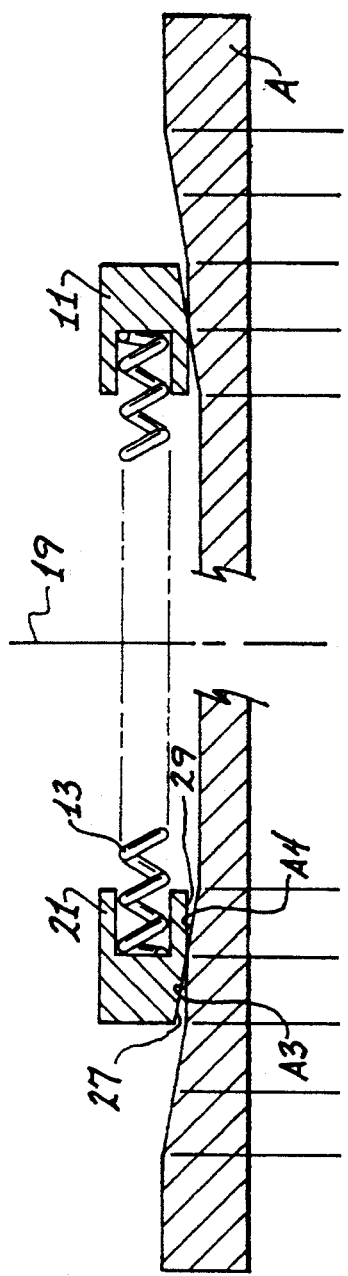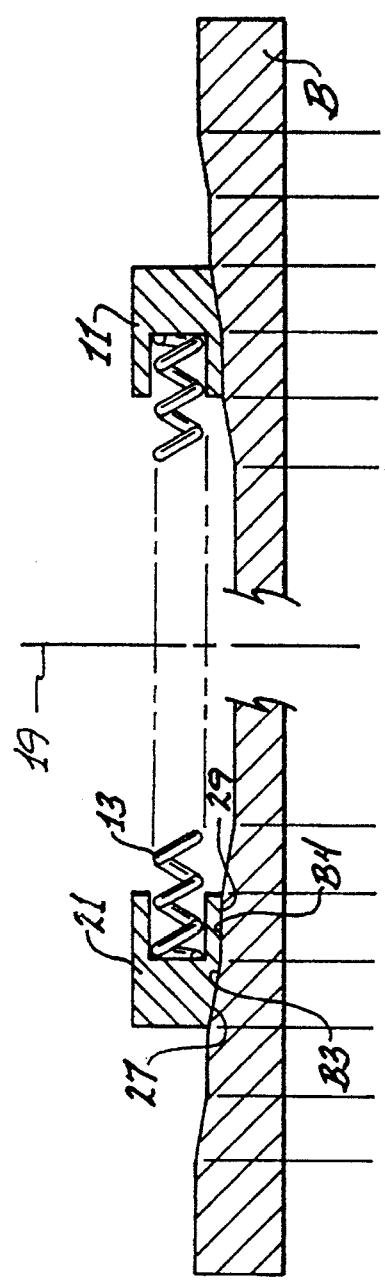
Fig. 13A
Fig. 13B
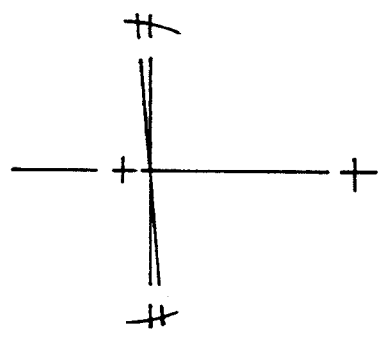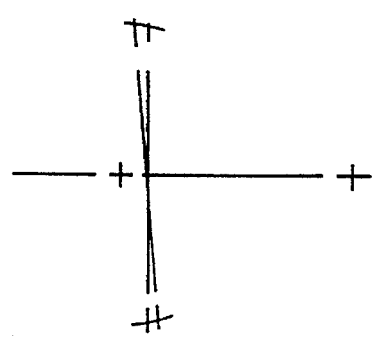

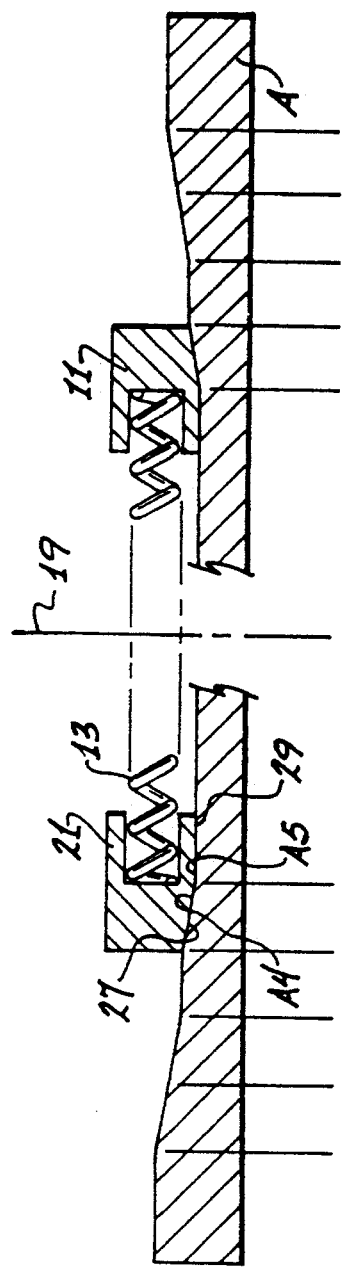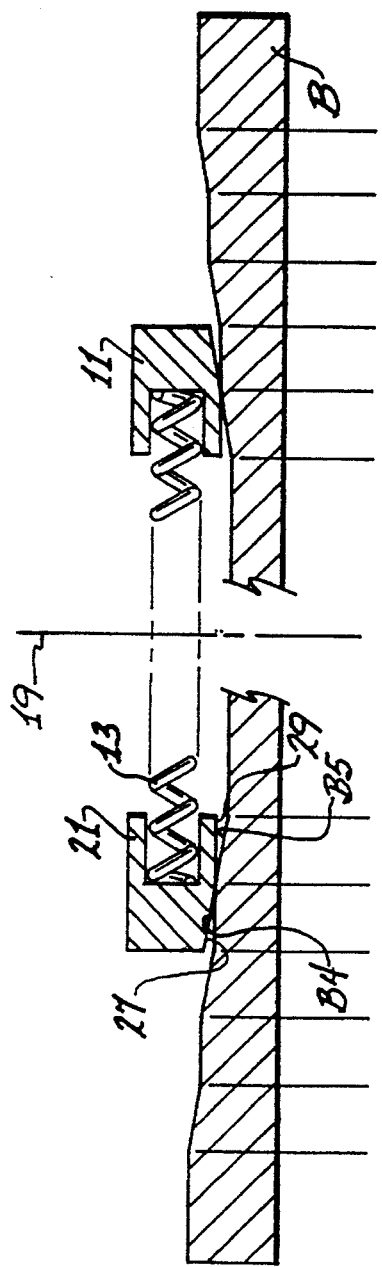
Fig. 15A
Fig. 15B
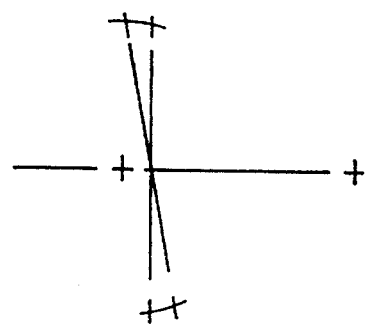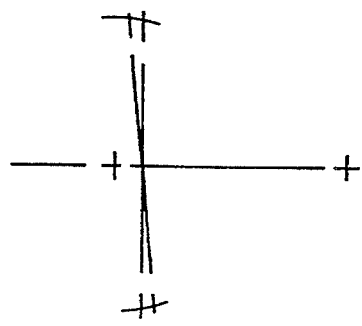

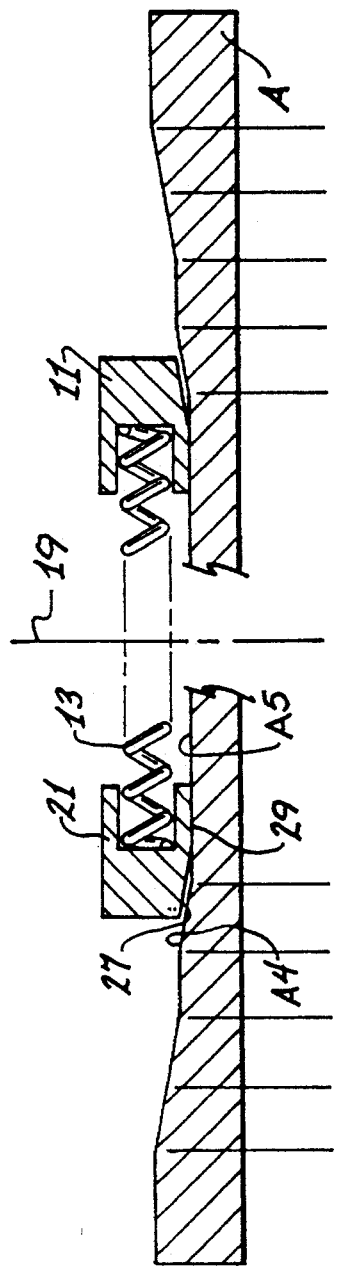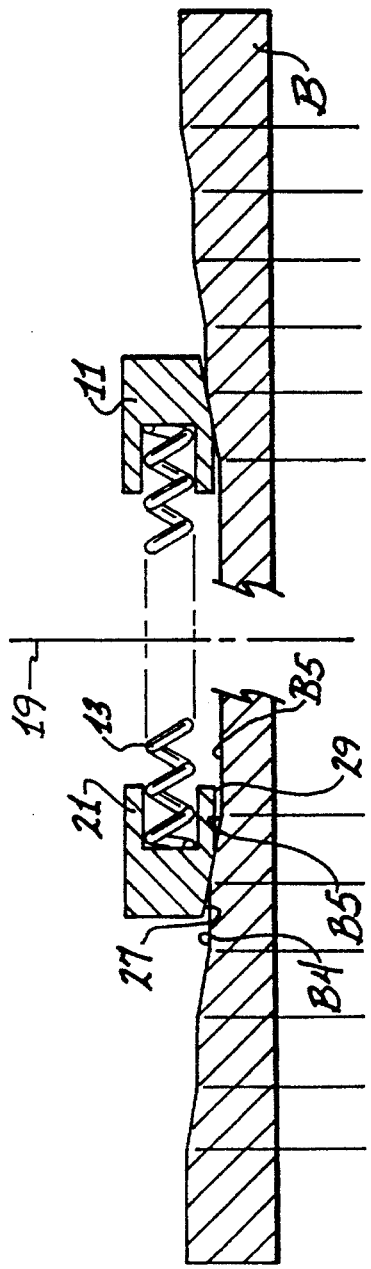
Fig. 16A
Fig. 16B
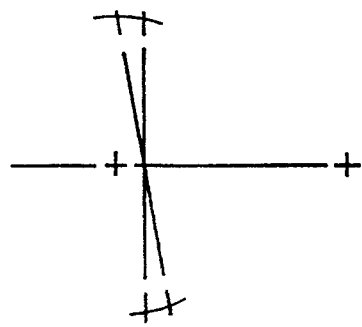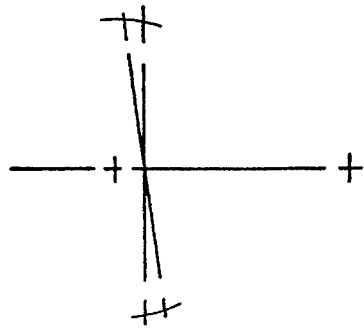

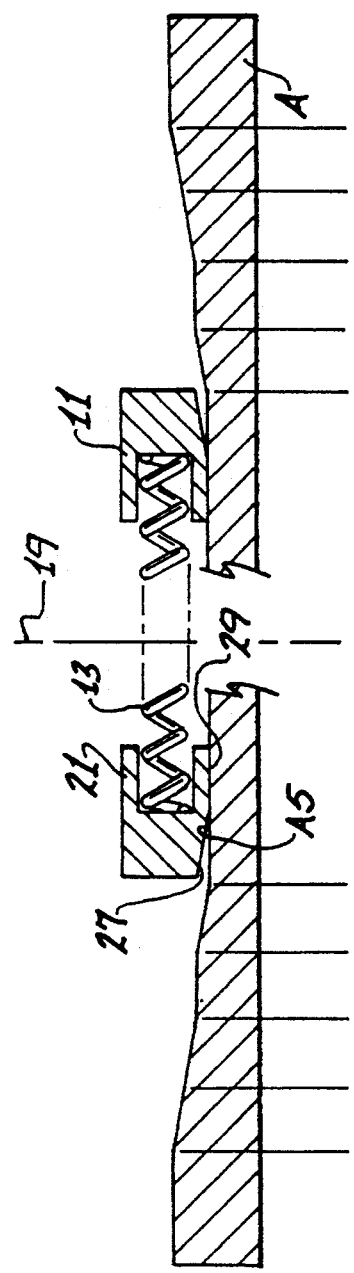
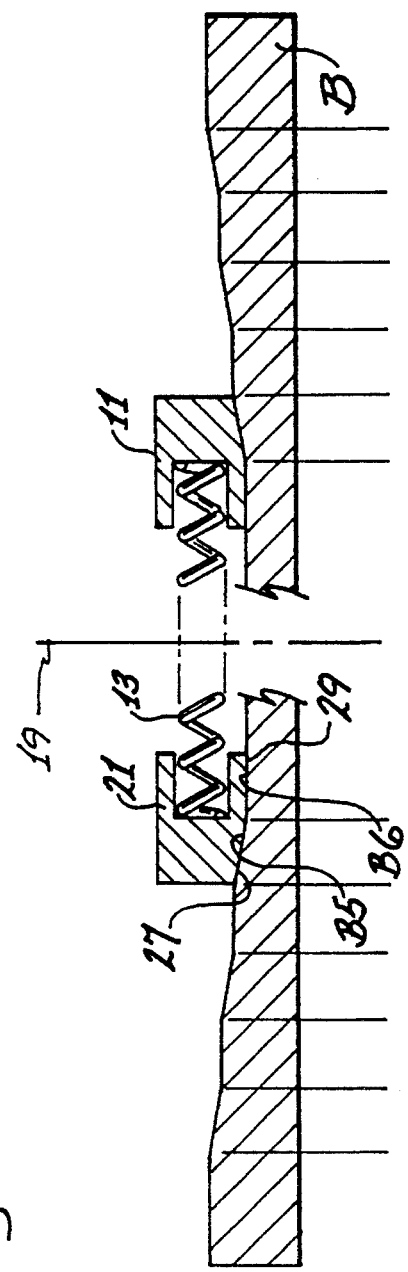
Fig. 17A
Fig. 17B
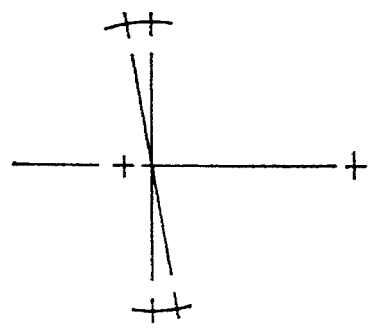
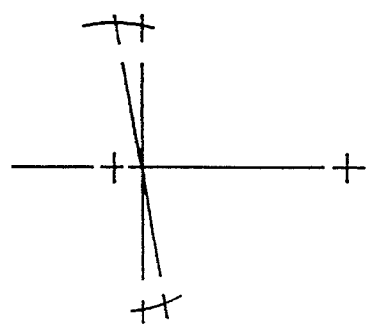

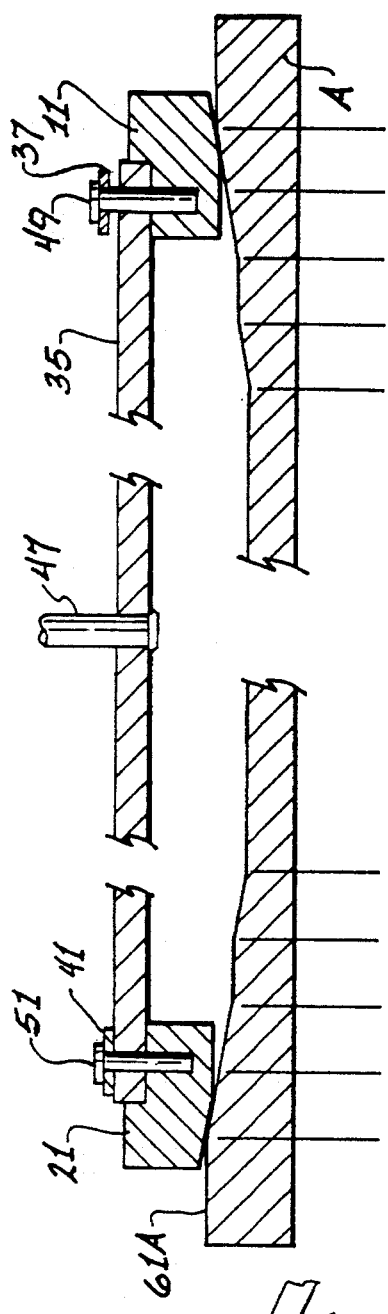
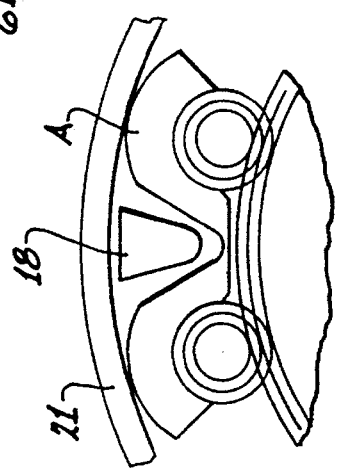
Fig. 21A
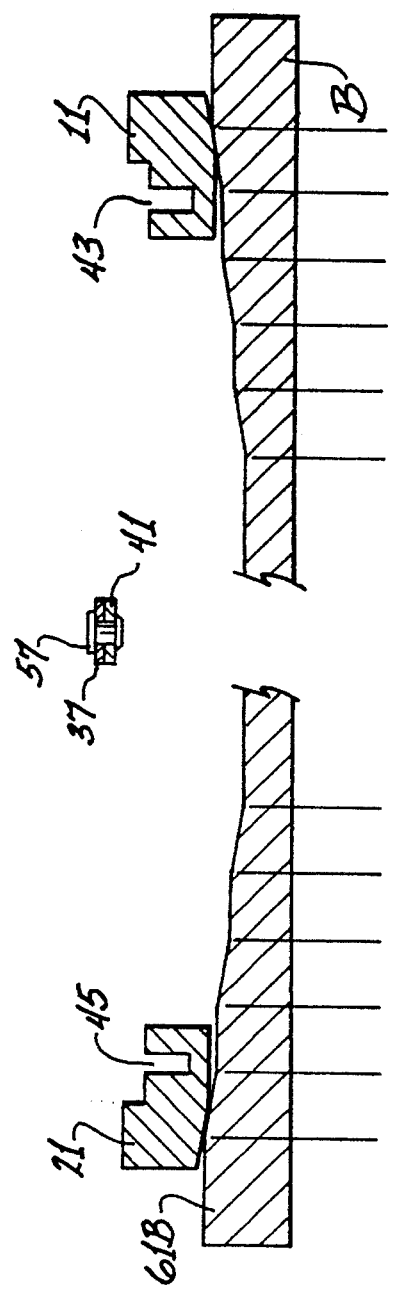
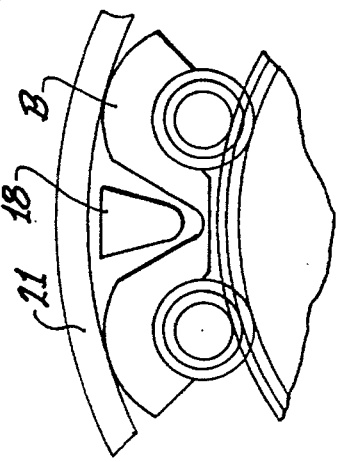
Fig. 21B

CONTROLLABLE PARALLEL AXIS DIFFERENTIAL

This is a Continuation-in-Part Application of U.S. patent application Ser. No. 08/282,622 filed Jul. 29, 1994, entitled Differential With Pivotable Gear Mountings, which, in turn, is a Continuation-in-Part of U.S. patent application Ser. No. 08/058,480, filed May 6, 1993, U.S. Pat. No. 5,415,599, entitled Gear Mounting System for Differential, both of which are hereby incorporated by reference.

TECHNICAL FIELD

The present invention relates to automotive differentials having planetary gears mounted within a housing for connecting an input shaft to a pair of output shafts and to means for controlling the torque bias ratio of differentials by controlling movable mountings of the gears within the housing.

BACKGROUND OF THE INVENTION

As is well known, a differential is a gear assembly in a motor vehicle which allows the drive shaft to turn the drive wheels at different speeds when the vehicle is going around a curve. When a vehicle goes around a curve, the wheel on the inside of the curve travels less distance than the other, and so must turn more slowly, for safety in handling and to keep tire wear to a minimum. Some units are designed to give a limited-slip or slip-lock differential, to equalize power between the wheels on a slippery or a soft road surface, providing safe handling and minimizing the likelihood of getting stuck in snow or soft earth.

Automotive differentials are positioned within drive lines for dividing engine drive power between two output shafts. Front and rear differentials respectively divide the engine power between the axle halves of front and rear axles, and center differentials divide the engine power between drive shafts to the front and rear axles.

A planetary gear set mounted within a differential housing interconnects the two output shafts for rotation in opposite directions with respect to the housing (i.e., differentiation). An input shaft delivers engine power to the housing for rotating the housing together with the planetary gear set about a common axis of the pair of output shafts.

Sun gear members of the planetary gear set, also referred to as "side gears", are coupled to inner ends of the output shafts. Planet gear members of the same set are positioned within the housing for transmitting power between the sun gears. The planet gear members may be arranged in a "cross-axis" orientation with respect to the axes of the sun gears, or in a "parallel-axis" orientation, where the axes of the planet gears are parallel to the coincident axes of the side gears and output shafts. In a parallel-axis configuration, one portion of each planet gear meshes with one of the side gears, and another portion of each planet gear meshes with its paired planet gear.

Commonly assigned U.S. Pat. No. 5,122,101 to Tseng discloses a parallel-axis gear differential in which the planet gears are formed as so-called "combination" gears having main and transfer gear sections separated by a stem. The main gear section meshes both with one of the two side gears and with the transfer section of a paired combination gear. The transfer gear section meshes with the main gear section of the paired combination gear. The two meshes between paired combination gears straddle two meshes between the paired combination gears and the side gears.

Another known parallel-axis gear differential includes one combination gear member of each planet gear pair. The main gear section of the one combination gear member meshes with one of the two side gears, and the transfer gear section meshes with its paired planet gear. The single mesh between the paired planet gears overlaps one side of the two planet gear-to-side gear meshes.

The planet gears can be supported for rotation on shafts or within pockets formed in the housing. The shafts are received within bores that are also formed in the housing. The pockets provide bearings for supporting outside cylinder surfaces of the planet gears including top lands of the planet gear teeth. U.S. Pat. No. 5,244,440 to Ichiki et al., which is also commonly assigned, discloses such pockets as well as gearing relationships for maintaining preferred gear running positions within the pockets.

My grandparent Application No. 08/058,480 discloses an alternative gear mounting system in which the planet gears are supported in pairs between pedestals. Each pedestal has two gear mounting surfaces for supporting one member from each of two adjacent pairs of planet gears. Gear reactionary forces can be transmitted between the pairs of planet gears by mounting the pedestals on pivots.

The planetary gearing interacts with its mounting surfaces to produce frictional torque that supports uneven distributions of drive torque between the two output shafts. The frictional torque opposes relative rotation between the output shafts (i.e., differentiation) proportional to a drive torque applied to the housing. Accordingly, drive torque is divided between relatively rotating output shafts in accordance with a so-called "bias ratio", which is expressed as a normalized ratio of the torque in the output shaft receiving more torque divided by the torque in the output shaft receiving less torque.

The resistance to differentiation can compensate for uneven amounts of traction available to a pair of drive wheels. For example, a bias ratio of 2:1 can distribute two times more torque to one drive wheel of a pair having higher traction than the other. This prevents the lower traction drive wheel from spinning with respect to its traction surface and provides for the delivery of more total torque.

The frictional torque opposing relative rotations of the output shafts is composed of a series of frictional torques developed at different frictional interfaces throughout the differential. However, patterns of loading at the frictional interfaces vary depending upon directions of torque transfer through the differential. For example, the loading patterns vary between forward drive loading and reverse drive loading. Opposite directions of differentiation also change loading patterns.

Different bias ratios can result from the different loading patterns. In some instances, such different bias ratios are desirable; and in other instances, they are undesirable. However, even when different bias ratios are desirable, each bias ratio can still have a preferred value. For example, one bias ratio can be preferred for forward drive loading and another bias ratio can be preferred for reverse drive loading. Different bias ratios can also be preferred in center differentials for independently controlling the percentages of torque that can be distributed to the front and rear axles during opposite directions of differentiation. In contrast, only one bias ratio is generally preferred for opposite directions of differentiation in front and rear differentials.

In conventional differentials, torque bias ratios (TBRs) are largely a function of design structure. For example, cross-axis differentials typically demonstrate TBRs of 2.5:1 to 4:1 while parallel-axis differentials typically demonstrate TBRs of 1:1 to 2.5:1.

In most differentials, only limited possibilities exist for independently controlling bias ratios in the different directions of torque transfer. Most attempts at controlling bias ratios have thus far involved varying coefficients of friction between interfaces that are loaded differently between two or more directions of torque transfer. For example, co-assigned U.S. Pat. No. 4,890,511 to Pederson uses different coefficients of friction on opposite sides of a stationary washer to influence bias ratios in opposite directions of differentiation. Another co-assigned U.S. Pat. No. 5,232,415 to Brewer et al. uses different coefficients of friction at planet gear end faces to influence bias ratios both between opposite directions of differentiation and between forward and reverse drive.

In my parent Application No. 08/282,622, I disclose a differential which uses unique movable gear mounting surfaces to control bias ratios between forward and reverse loading, as well as variations in the gearing configuration with respect to the movable mounting surfaces which can be used to control bias ratios associated with opposite directions of differentiation. In this invention, pivoting pedestals function to transfer gear reactionary forces between following gear members and leading gear members.

A differential which can be controlled would be desirable and beneficial in vehicle handling. It would have a reduced TBR range (i.e., 2:1 to 2.5:1) for normal driving conditions, and an increased TBR range (i.e., 2.5:1 to 4:1) for greater traction during maneuvers or on variable road surfaces. For extreme differences in traction, the differential would lock. What is needed, then, is a differential which provides a fine control of TBR, and a differential whose TBR can be controlled by external means (i.e., an "active" differential).

SUMMARY OF THE INVENTION

The present invention is a parallel-axis differential comprising a housing rotatable in forward and reverse drive directions about a common axis of rotation of a pair of drive shafts, first and second side gears positioned within the housing for receiving ends of the respective drive shafts for rotation therewith about the common axis, first and second pairs of planet gears positioned within the housing in engagement with the side gears for rotation about respective axes that extend parallel to the common axis of rotation, each of the pairs of planet gears including a leading planet gear member and a following planet gear member, the leading planet gear member being angularly advanced in the forward drive direction about the common axis with respect to the following planet gear member of each pair, a first toggle having first and second bearing surfaces and being mounted in the housing between the first and second pairs of planet gears, the first bearing surface of the first toggle rotationally supporting the leading member of the first pair of planet gears, the second bearing surface of the first toggle rotationally supporting the following member of the second pair of planet gears, the first toggle being pivotable about a first pivot axis that extends parallel to the planet gear axes for transmitting a gear reactionary force between the leading and following members of the first and second pairs of planet gears; and, means for controlling the first toggle and for controlling the amount of the gear reactionary force transmitted between the leading and following members of the first and second pairs of planet gears. In one embodiment, the means for controlling the toggle is "passive" (i.e., the control is inherent in the differential) whereas in a second embodiment, the means for controlling the toggle is "active" (i.e., the toggle is controlled by a means external to the differential).

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

FIGS. 9A–17A and 9B–17B illustrate the position and action of the control rings on toggles A and B, respectively;

FIGS. 21A and 21B are views similar to FIGS. 9A and 9B, respectively, except showing a position of the rings attainable only in the second embodiment.

DESCRIPTION OF THE PREFERRED EMBODIMENTS

Figure 1:
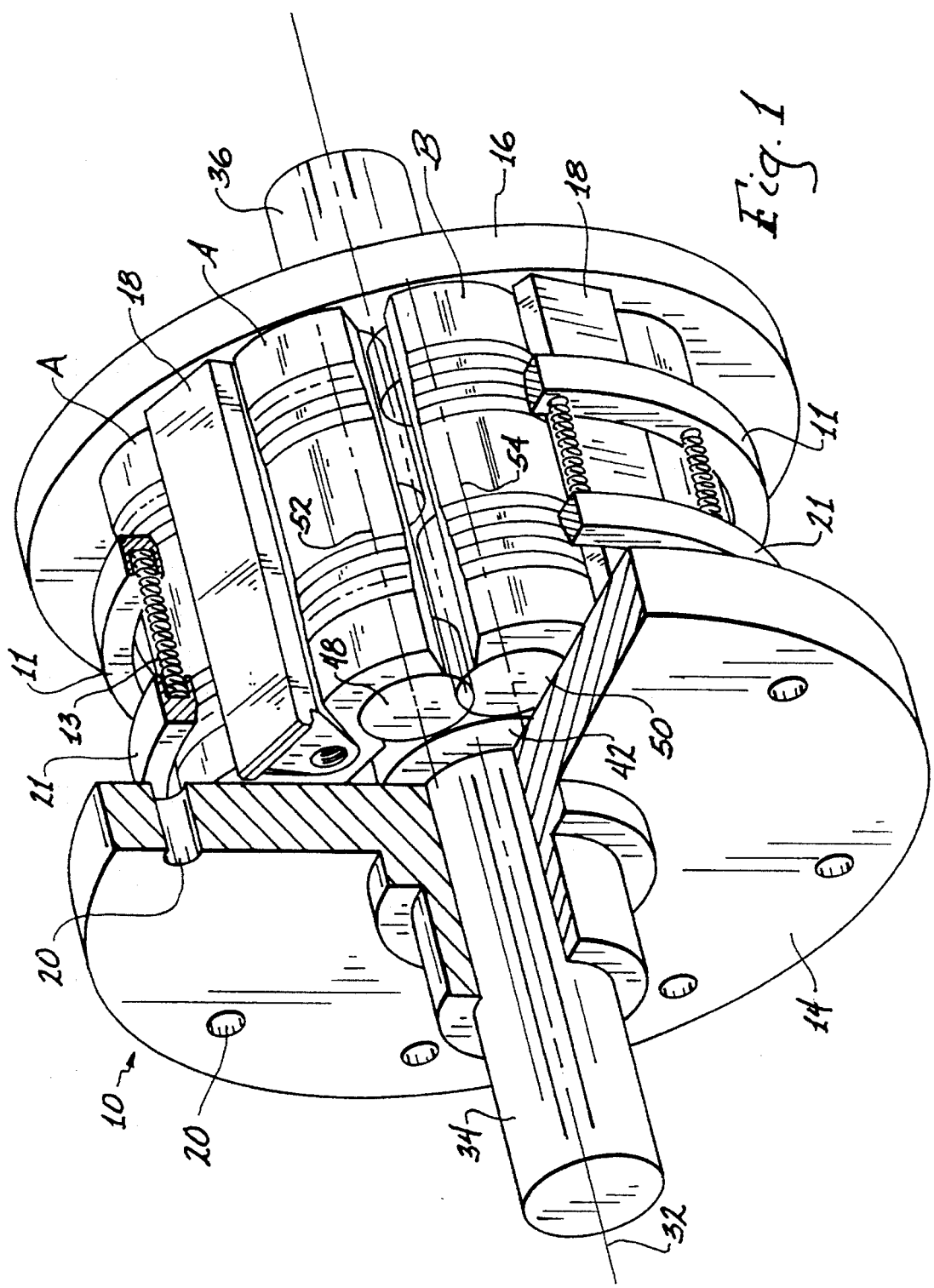
FIG. 1 is a perspective view of a first embodiment of the present invention, with sections of the differential cut away for illustration.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire "written description" of this invention.

Referring now to the drawings, this invention broadly provides a controllable parallel axis differential, of which two embodiments are disclosed. In one embodiment, herein referred to as a "passive" embodiment, the control of the torque bias ratio is inherent in the structural design, and may not be varied at will as the differential operates. In a second embodiment, the torque bias ratio is controlled externally, allowing the torque bias ratio to be controlled at will.

The two embodiments will be described seriatim herebelow:

First Embodiment

Figure 2:
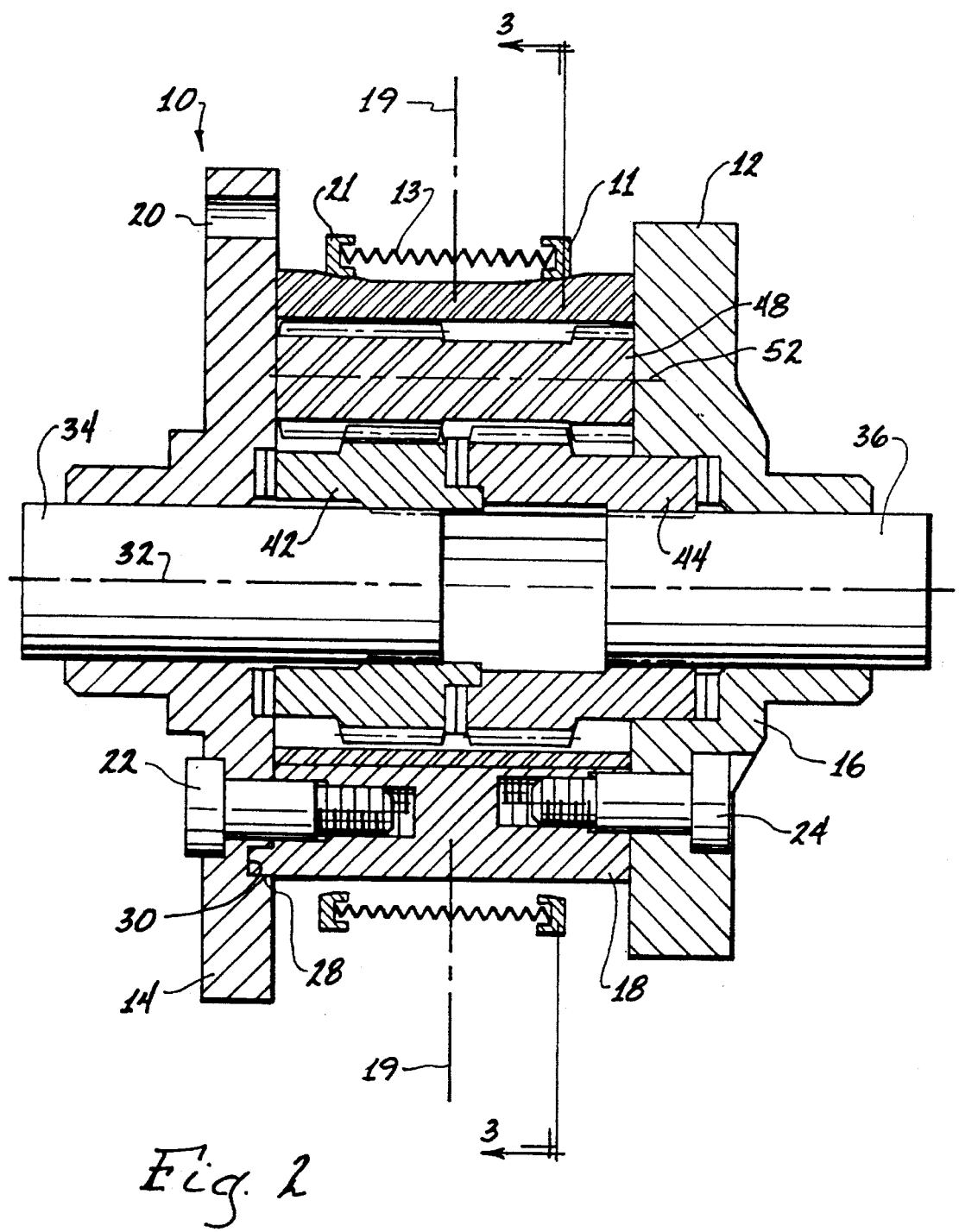
FIG. 2 is an axial sectional view taken generally along line 2—2 of FIG. 3 through a first embodiment of a parallel-axis gear differential modified in accordance with my invention.
Figure 3:
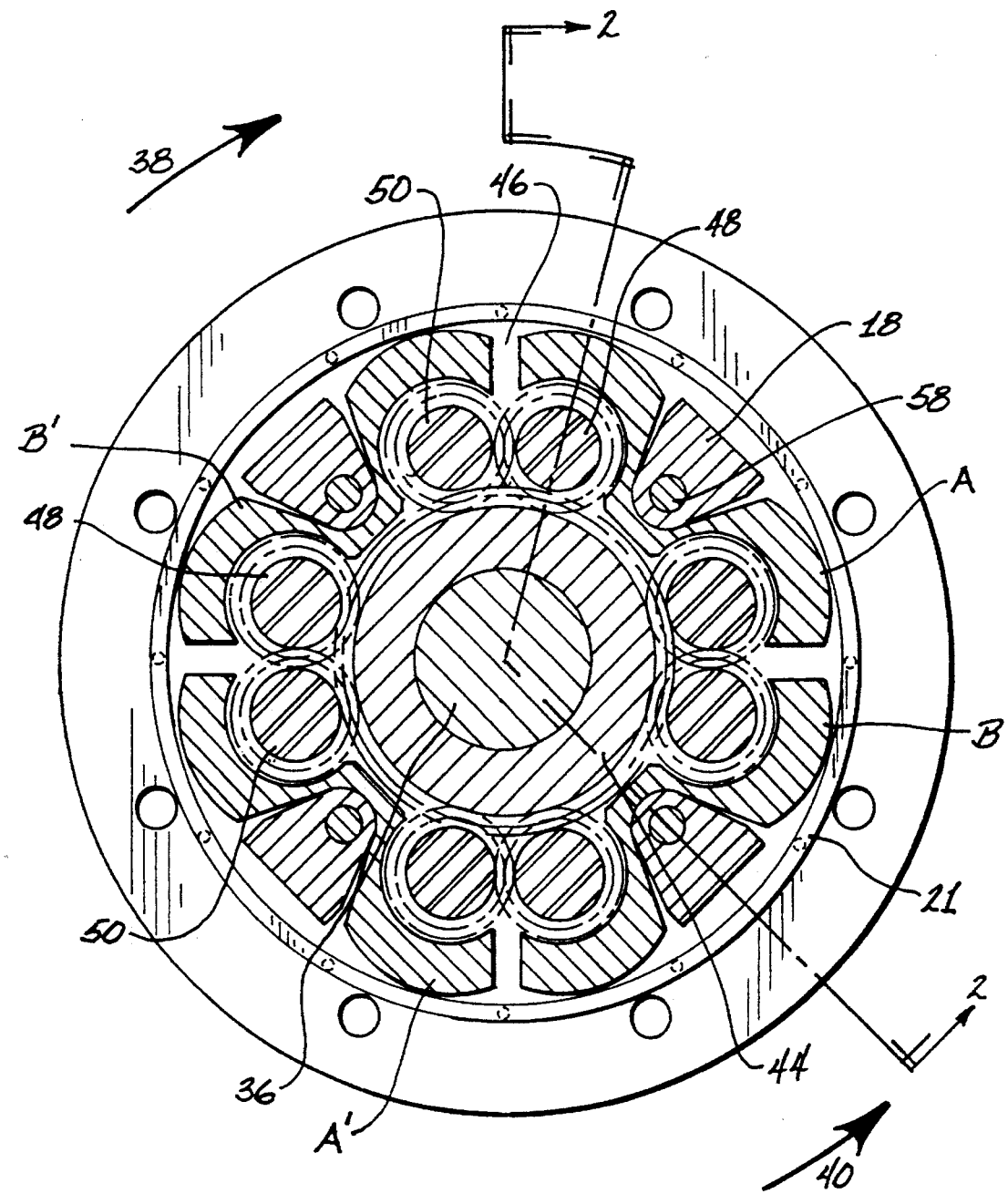
FIG. 3 is a transverse sectional view taken generally along line 3—3 of FIG. 2 through the same differential, showing the toggles in a "neutral" (i.e., non-pivoting) position.

Illustrated by FIGS. 1, 2 and 3 is a parallel-axis gear differential 10 that includes a housing 12 having a flange end 14 and a cap end 16 joined by four columns 18. The flange end 14 has holes 20 for mounting a ring gear (not shown) that transmits drive power to the housing 12. Non-aligned bolts 22 and 24 join the columns 18 to the flange end 14 and cap end 16. In a preferred embodiment, key-like projections 26 of the columns 18 (shown also in FIG. 5) have flat locating faces 28 that mate with side walls of slots 30 in the flange end 14. In the embodiment shown, only one key-like projection is shown, however, it is to be understood that the column may be keyed at both ends. Both the non-aligned bolts 22 and 24 and the mating projections 26 and slots 30 prevent the columns 18 from rotating.

The housing 12 is rotatable about a common axis 32 of a pair of output shafts 34 and 36 in forward 38 and reverse 40 drive directions (shown in FIG. 3). The terms "forward" and "reverse" refer to opposite directions of housing rotation, and the terms "drive" and "coast" refer to opposite directions of power transfer between the housing 12 and the output shafts 34 and 36. These distinctions are important because differential loading patterns in the forward drive direction are similar to loading patterns in the reverse coast direction, and loading patterns in the reverse drive direction are similar to loading patterns in the forward coast direction. Side gears 42 and 44 are coupled to inner ends of the two output shafts 34 and 36 for rotation therewith about the common axis 32. The side gears 42 and 44 are interconnected by four pairs of planet gears 46, each pair having a leading planet gear member 48 and a following planet gear member 50 rotatable about respective axes 52 and 54 that extend parallel to the common axis 32. The leading planet gear member 48 is angularly advanced about the common axis 32 in the forward drive direction 38 with respect to the following planet gear member 50.

Four toggles A, A', B, and B' are pivotally mounted on the columns 18 for angular movement about pivot axes 58 that also extend parallel to the common axis 32. Toggles A and A' are identical, and toggles B and B' are identical. Toggle A and toggle A' are positioned in diametric opposition and operate in synchronism, and toggle B and toggle B' are also diametrically opposed and also operate in synchronism.

Figure 4A:
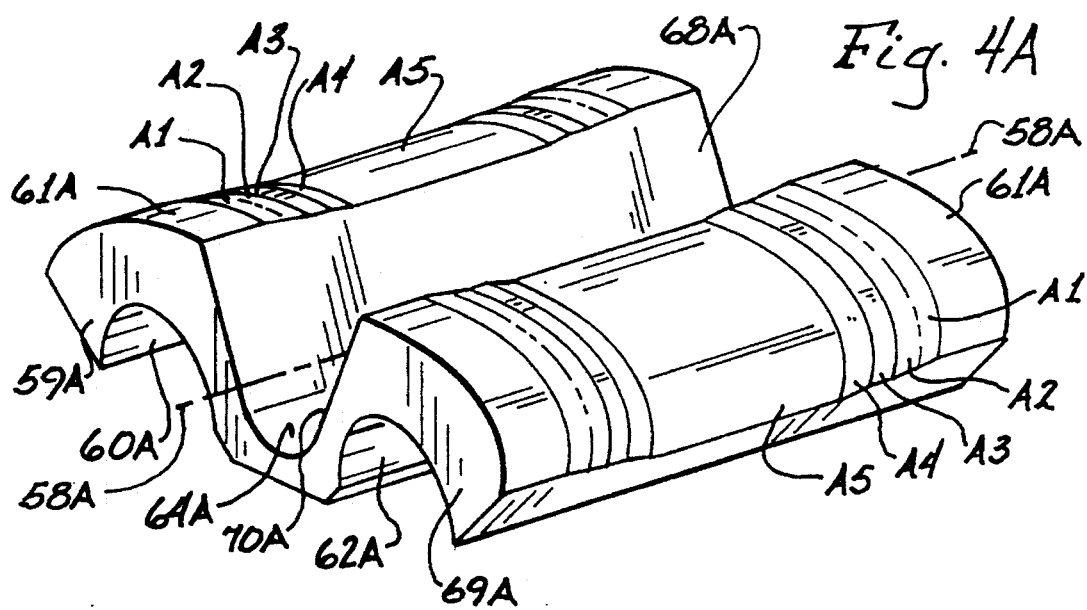
FIG. 4A is a perspective view of toggle A of the invention.

As shown in FIG. 4A, toggle A has two arms 59A and 69A, and each arm is identical. Toggle A also has a first bearing surface 60A for rotationally supporting the leading member 48 of one of the planet gear pairs and a second bearing surface 62A rotationally supporting the following member 50 of an adjacent planet gear pair. Likewise, toggle B has a first bearing surface 60B for rotationally supporting the leading member 48 of one of the planet gear pairs and a second bearing surface 62B rotationally supporting the following member 50 of an adjacent planet gear pair.

Toggle A has a generally cylindrical first outer surface 61A on each end, and a series of symmetric "ramps" and "flats" leading from each end to the center of the toggle. Each flat is actually a cylindrical surface and each ramp is actually a frusto-conical surface. FIG. 4A illustrates the outer surfaces of toggle A, in order from end to center as follows: first cylindrical surface 61A, frusto-conical surface A1, frusto-conical surface A2 (a continuation of surface A1), intermediate cylindrical surface A3, frusto-conical surface A4, and second cylindrical outer surface A5. The center of the toggle defined by surface A5 has a lesser diameter than the two ends of the toggle defined by surface 61A. The toggle is symmetrical about center plane 19.

Figure 4B:
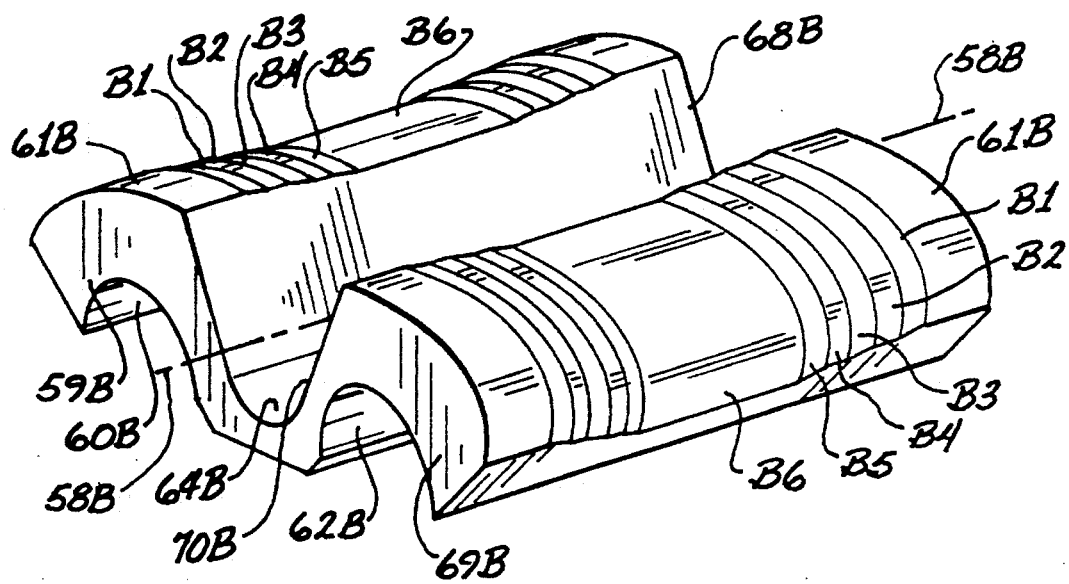
FIG. 4B is a perspective view of toggle B of the invention.

As shown in FIG. 4B, toggle B has two arms 59B and 69B, and each arm is identical. Toggle B also has a generally cylindrical first outer surface 61B on each end, and a series of symmetric "ramps" and "flats" leading from each end to the center of the toggle, which has a cylindrical surface of lesser diameter than the two ends. Each flat is actually a cylindrical surface and each ramp is actually a frusto-conical surface. FIG. 4B illustrates the outer surfaces of toggle B, in order from end to center as follows: first outer cylindrical surface 61B, frusto-conical surface B1, first intermediate cylindrical surface B2, frusto-conical surface B3, second intermediate cylindrical surface B4, frusto-conical surface B5, and second outer cylindrical surface B6. The center of the toggle defined by surface B6 has a lesser diameter than the ends of the toggle defined by surface 61B. The toggle is symmetrical about center plane 19.

Figure 5:
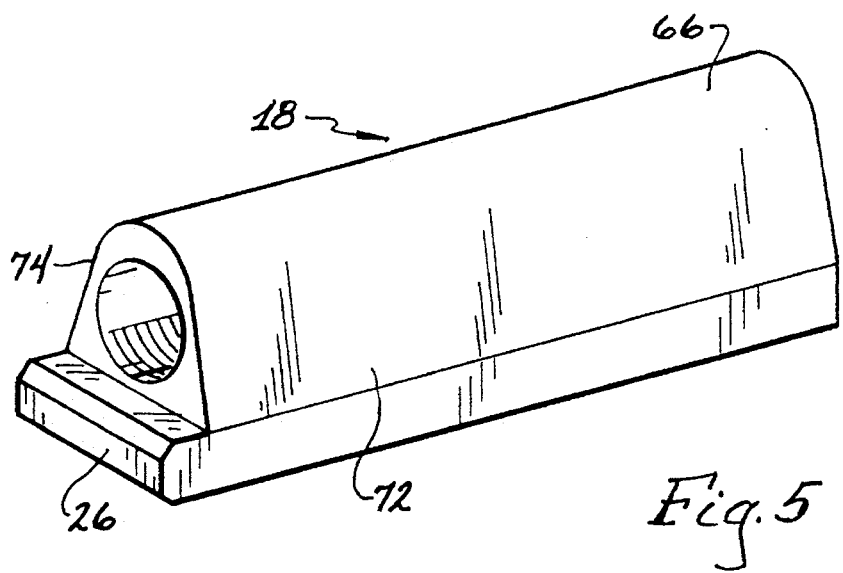
FIG. 5 is a perspective view of one of four support columns shown in FIGS. 1–3.

As shown in FIGS. 4A, 4B and 5, a journal portion 66 of the support column 18 mates with a third bearing surface 64A and 64B of toggles A and B, respectively, for pivotally mounting the toggles within the housing 12. Clearance surfaces 68A and 68B, and 70A and 70B of the toggles are angularly spaced with respect to column faces 72 and 74 to permit a range of angular movement about the pivot axes 58A and 58B. Alternatively, one of the column faces 72 or 74 could be positioned to form a stop for limiting movement of the toggles in one direction about the pivot axes 58A and 58B.

Figure 6:
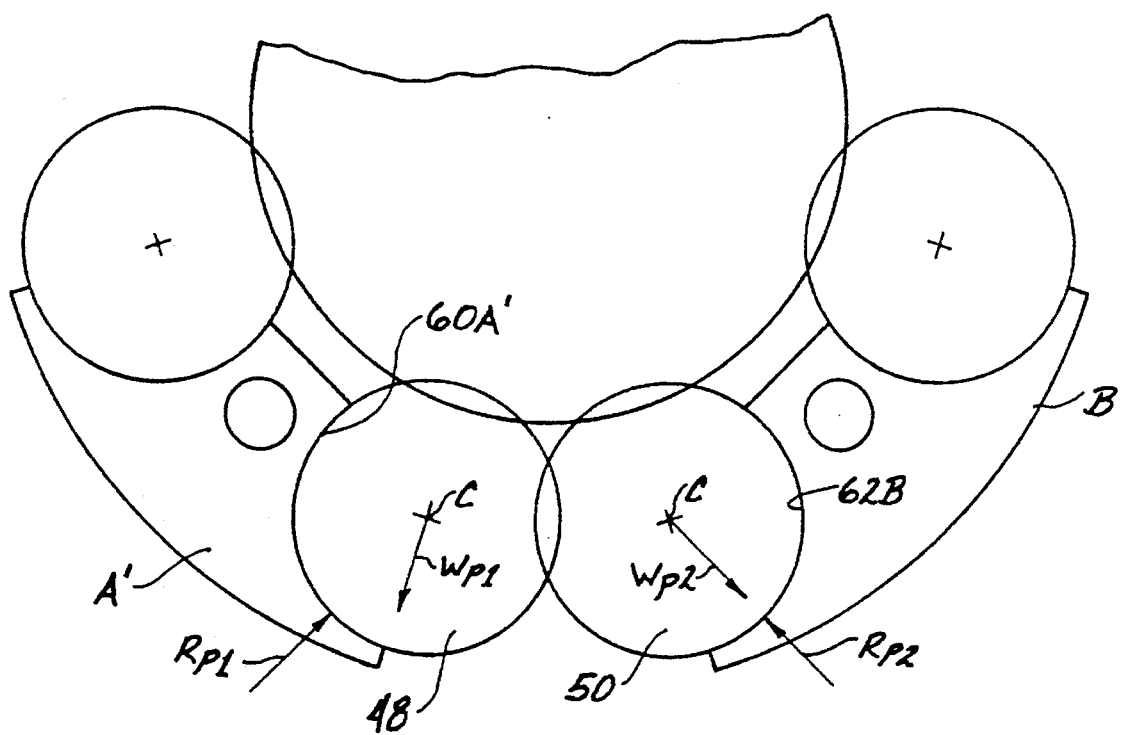
FIG. 6 is a schematic representation of an axial sectional view through a portion of the differential of FIG. 1 showing reactions between the planet gears and the toggle mechanisms.

As best illustrated in the schematic view of FIG. 6, the bearing surfaces 60A' and 62B of toggles A' and B, respectively, which share a substantially common center of curvature "C" with the planet gear members 48 and 50, contact the outer cylindrical surfaces of the planet gear members 48 and 50. Gear thrust forces "$W_{p1}$" and "$W_{p2}$", generated by the respective meshes of each planet gear member, urge the planet gears 48 and 50 into contact with the bearing surfaces 60A' and 62B. Reactionary forces "$R_{p1}$" and "$R_{p2}$", applied by the respective bearing surfaces 60A' and 62B, limit movement of the planet gear members 48 and 50, respectively. In the forward drive direction 38 (shown in FIG. 3), the following planet gears develop a greater radial thrust force than the leading gears, which tends to pivot the toggles in a counter-clockwise orientation. In the reverse drive direction 40, the opposite is true, i.e., the leading gears develop a greater radial thrust force than the following gears, which tends to pivot the toggles in a clockwise rotation.

Figure 7:
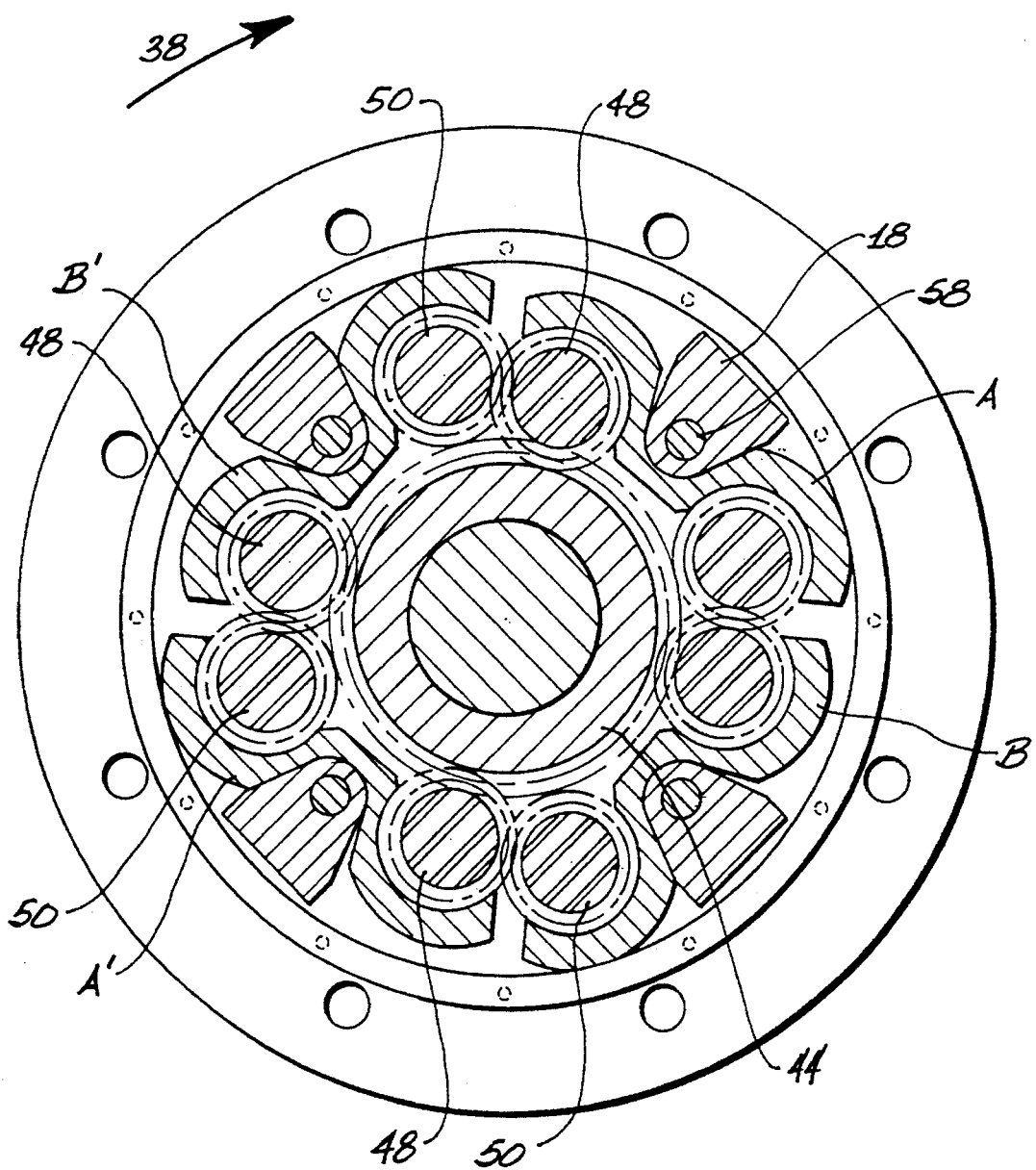
FIG. 7 is a transverse sectional view similar to that of FIG. 3, except showing all four toggles fully pivoted in a counter-clockwise direction, to create maximum friction and a maximum torque bias ratio.

The unrestricted toggling action is illustrated in exaggerated fashion in FIG. 7, which is a transverse sectional view similar to that of FIG. 3, except showing all four toggles fully pivoted in a counter-clockwise direction, to create maximum friction and a maximum torque bias ratio. This drawing figure is exaggerated and therefore not completely accurate. Specifically, the following gears 50 are shown as not being in engagement with side gear 44, which, in actuality, could never happen. The exaggeration is intended solely to illustrate the toggling action.

A means of controlling the toggling action, and hence the torque bias ratio of the differential, is shown in FIG. 1. The controlling means includes a pair of annular control rings 11 and 21 which surround the toggles and support columns and a plurality of springs which connect the two control rings. Leftward control ring 21 and rightward control ring 11 are connected by a plurality of compression springs 13. Each annular ring contains a plurality of partial through-bores 31 (shown in FIG. 8) in which the springs 13 are mounted. In a preferred embodiment, twelve springs are equally spaced about the circumference of the rings.

Figure 8:
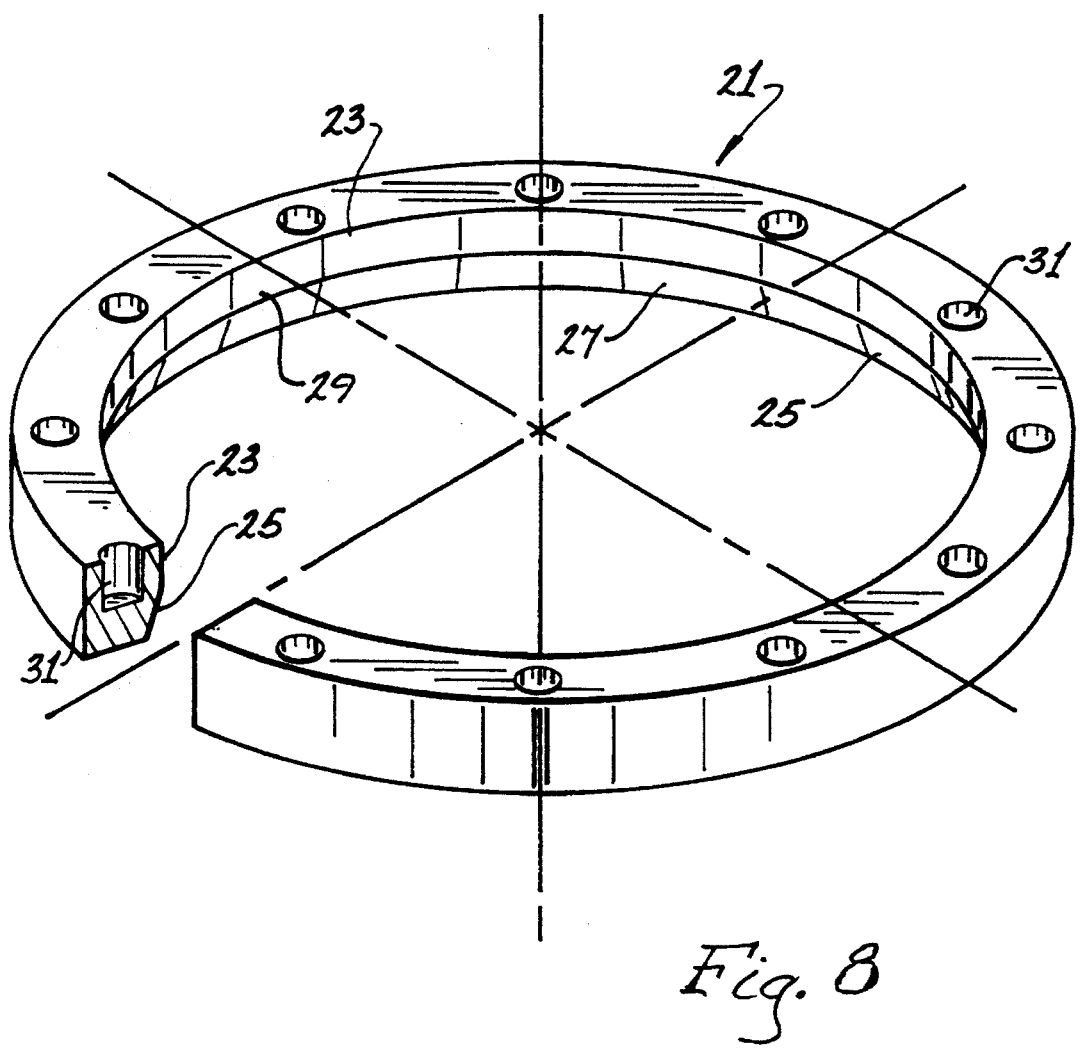
FIG. 8 is a perspective view of one of the control rings of the differential, with a section cut away.

FIG. 8 illustrates control ring 21 in a perspective view with part of the ring cut away. The ring is seen as having a cylindrical section 23 and a cylindrical-frusto-conical section 25. Section 25 has an inwardly facing frusto-conical surface 27, and section 23 has an inwardly facing cylindrical surface 29. The cylindrical section contains the partial through-bores 31 in which the compression springs are mounted.

Adverting to FIG. 2, it is seen that the control rings are mounted such that the cylindrical sections of each ring are closest one another and closer to the axial center 19 of the differential than are the cylindrical-frusto-conical sections. Control ring 11 is a mirror image of control ring 21.

Operation

As torque is applied all toggles begin to pivot. If left unrestricted, the pivoting action will transmit thrust force from one planet gear (e.g., leading gear) through its toggle, to its corresponding planet gear (e.g., following gear), thereby forcing the corresponding planet gear under the other toggle arm into a tighter mesh with the side gear, rapidly increasing the torque bias ratio.

The control rings/spring combination functions to resist the toggling effect, thereby controlling the torque bias ratio. Drawing FIGS. 9A–17A and 9B–17B illustrate the position and action of the control rings on toggles A and B, respectively, and also illustrate schematically the relative toggling action permitted. The control rings are forced closer together as differentiation increases, i.e., as the natural thrust forces of the planet gears tend to increase the toggling force.

FIGS. 9A–17A and 9B–17B are fragmentary cross-sectional views of toggles A and B, respectively, and control rings 11 and 21. The figures illustrate the progressive movement of the control rings as differentiation occurs. In the description which follows, it is to be understood that the word "ramp" is synonymous with a frusto-conical surface of a toggle, and the word "flat" is synonymous with a cylindrical surface. For simplicity, only the position of control ring 21 is discussed, although it is to be understood that control ring 11 is a mirror image of control ring 21, and control ring 11 moves in synchronism with control ring 21.

FIGS. 9A–9B illustrate the differential at rest or equilibrium. The springs exert a slight preload on the rings and on the toggles, and the rings are positioned at their outer extreme positional limits (i.e., as far away from one another as possible). Surface 27 of ring 21 is in contact with surface A1, and surface 29 is not in contact with surface A2. Toggle A is free to toggle because inwardly facing frusto-conical surface 27 (ramp) is in contact with outwardly facing frusto-conical surface A1 (ramp), and the inwardly facing surface 29 is not in contact with a surface of the toggle. Surface 27 is also in contact with surface B1, but surface 29 is also in contact with surface B2, which restricts the motion of toggle B. It is seen that toggling is allowed when the frusto-conical surface of the ring aligns with a frusto-conical surface of the toggle; and toggling is restricted when the cylindrical surface of the ring aligns with a cylindrical surface of the toggle.

Figure 10A:
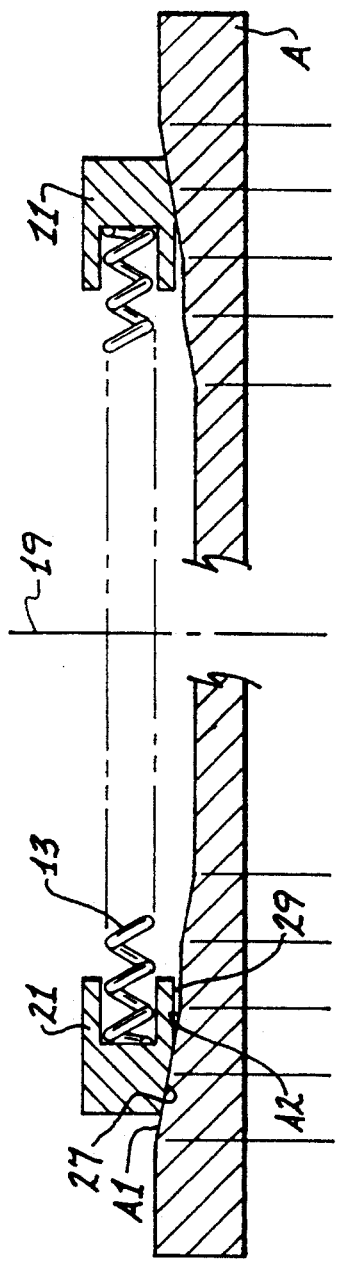
Figure 10B:
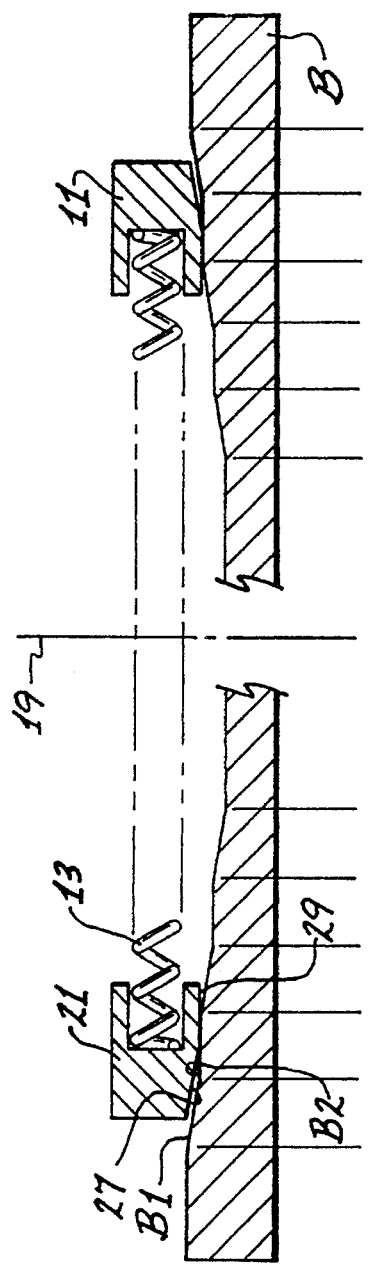

In FIGS. 10A and 10B, the rings have been forced by the toggles to move closer to one another. Toggle A is still free to toggle and toggle B is still restricted.

In FIG. 11A, ring 21 has moved rightwardly such that surface 29 is in contact with flat surface A3, thereby restricting the toggling motion of toggle A. At the same point in time, as seen in FIG. 11B, toggle B has transitioned between a restricted position to a free position.

In FIGS. 12A and 12B, toggle A is restricted whereas toggle B is now free to toggle.

In FIG. 13A, toggle A is in transition between a restricted and free position, whereas surface 29 is now in contact with flat (i.e., cylindrical) surface B4 shown in FIG. 13B, thereby restricting the movement of toggle B.

Figure 14A:
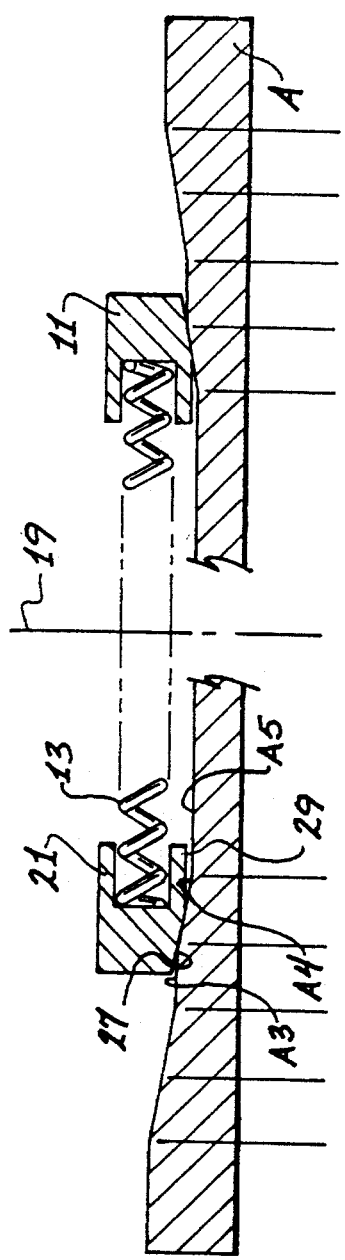
Figure 14B:
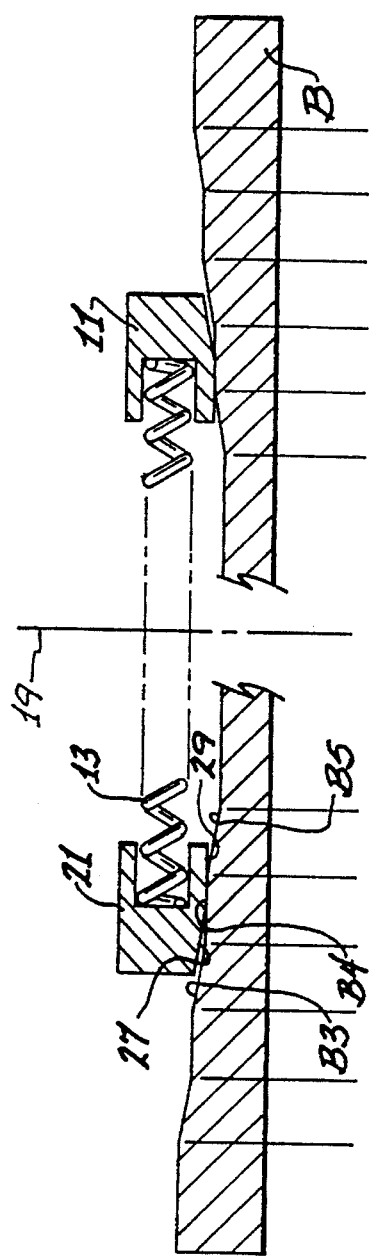

Toggle B is still restricted in movement in FIG. 14B because flat surface 29 aligns with flat surface B4, but, as shown in FIG. 14A, toggle A is free to toggle because ramp 27 aligns with ramp A1.

Toggle A's movement is restricted in FIG. 15A because flat surface 29 is aligned with flat surface A5. As shown in FIG. 15B, toggle B has transitioned from a restricted to a free position.

In FIGS. 16A and 16B, toggle A is fully pivoted, whereas toggle B is free.

Finally, FIGS. 17A and 17B illustrate the rings as close together as possible, and both toggles are fully pivoted and maximum force is transmitted through the toggle.

FIGS. 9A–17A and 9B–17B illustrate action of the toggles and control rings from a low torque bias ratio to a high torque bias ratio. In FIGS. 9A–9B, the control rings have a slight compressive force on the toggles which produces a light preload on the differential.

As torque increases, and under "low torque" conditions, the spring preload is overcome with no movement of the toggles so that the differential performs as a standard parallel axis differential. While the leading gear is in contact with the toggle, the load is so light that it has no significant effect on the bias.

Under "medium torque" conditions, the separating forces of the following gear overcome the new spring load, and the toggles begin to transfer the load to the leading planet gears, thereby increasing the number of friction surfaces. By offsetting the ramps in the toggles, it is possible to have only two opposing toggles move while the others remain relatively restrained, thus making it possible to generate two steps in the medium bias range. Whether all or half the toggles are involved, the leading gears are held between the designed pitch diameter and tight mesh.

Under increased separating force, the new spring load is overcome. The toggles may pivot fully and the separating force on the following planet gear pushes the leading planet gear into tight mesh with the side gear. Under these conditions, where all leading planet gears are in tight mesh as a result of the forces transmitted from the following planet gears, there is a gear mesh rolling resistance, and there is contact on the trailing side of the gear teeth, thereby adding a friction surface. This is the high torque bias ratio condition.

In the first embodiment described above, the torque bias ratio is controlled using the forces developed in the differential by torque, road conditions and induced spring loads. In this "passive" embodiment, torque bias ratio increases with torque.

It is possible, using an external control, to control the torque bias ratio independently of applied torque. This "active" differential is described as a second embodiment of the present invention herebelow.

Second Embodiment

Figure 18:
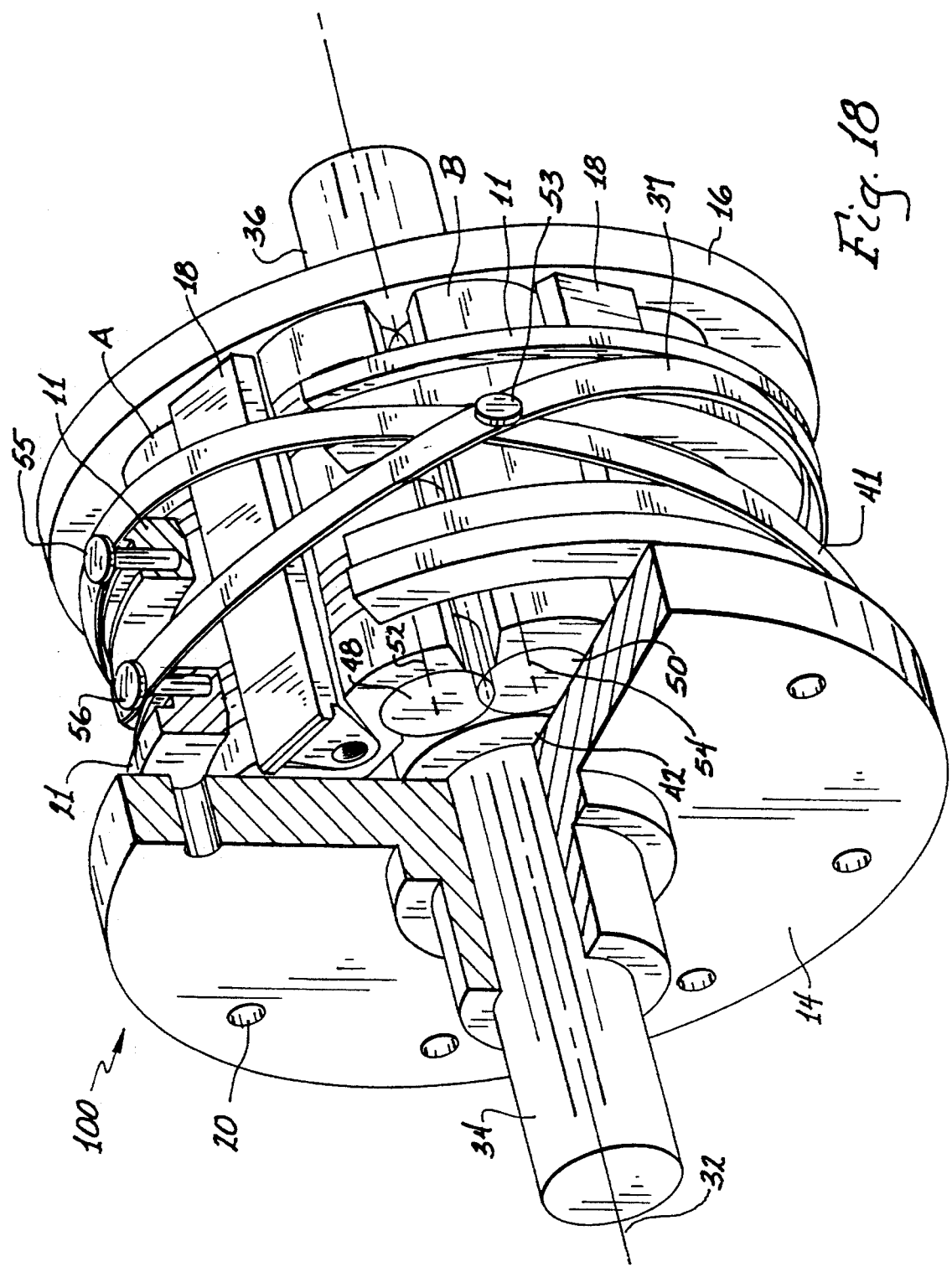
FIG. 18 is a perspective view of a second embodiment of the present invention, with sections of the differential cut away for illustration.

FIG. 18 is a perspective view of the second embodiment 100 of the invention. In this embodiment, the control ring/spring assembly has been replaced by a control ring/cam assembly 33. This embodiment, like the first, uses two control rings 21 and 11 to control the toggles, but the control rings are controlled by a cam which is externally activated. Thus, the rings can be placed at any desired position relative to the toggles, thereby controlling the torque bias ratio.

Figure 19:
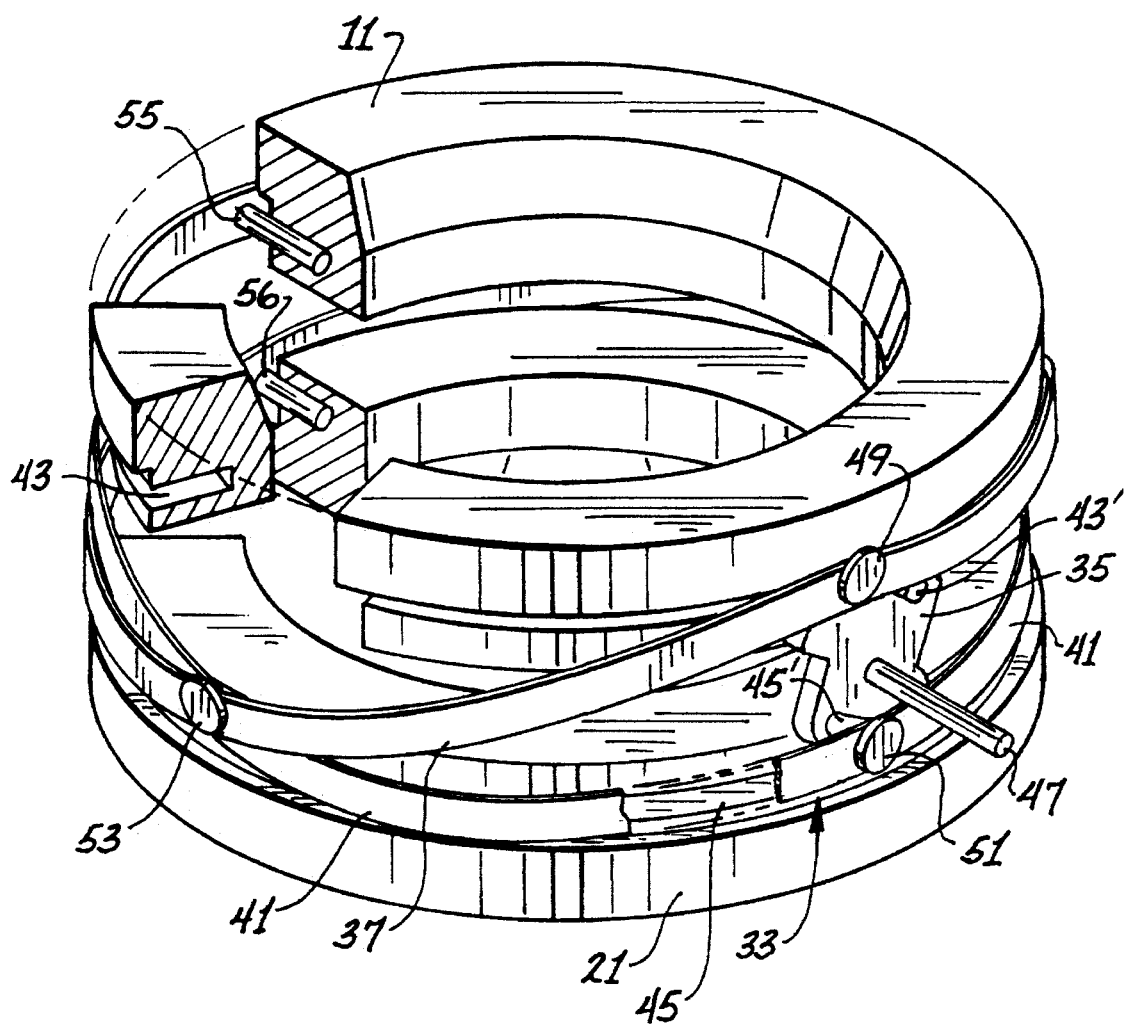
FIG. 19 is a perspective view of the ring/cam assembly of the second embodiment, with sections of the assembly cut away for illustration.
Figure 20:
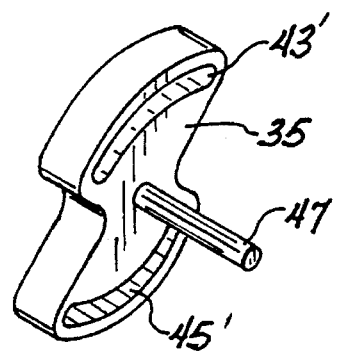
FIG. 20 is a detailed drawing of the cam of the second embodiment.

As shown in FIGS. 18 and 19, cam assembly 33 comprises cam 35 which controls inner cam hoop 41 and outer cam hoop 37. The two cam hoops are connected together and operatively arranged to pivot about pivot pins 53 and a corresponding pivot pin diametrically opposed from pin 53 (not shown). Inner hoop 41 is attached to control ring 11 by pin 55 which engages slot 43 of control ring 11, and outer hoop 37 is attached to control ring 21 by pin 56 which engages slot 45 of control ring 21. The control rings are positioned relative to toggles A and B as in the first embodiment. In operation, rings 11 and 21 rotate with the differential, whereas the cam assembly and hoops remain stationary. FIG. 20 illustrates cam 35 in detail, which includes first cam slot 43', second cam slot 45' and cam axle 47. Outer hoop cam pin 49 is secured to outer hoop 37 and control ring 11, and is slidingly engaged with slot 43'. Similarly, inner cam pin 51 is secured to inner hoop 41 and control ring 21, and is slidingly engaged with slot 45'.

Operation of the cam assembly is straight forward. As axle 47 of the cam is turned, the cam hoops (and the control rings) open or close depending upon the position of the cam. The hoops open widest, and the control rings are farthest apart, when the slots are in the orientation shown in FIGS. 19 and 20, and the hoops and rings are closest together when the slot orientation is shifted 90° relative to the position shown in FIGS. 19 and 20. The cam axle may be coupled to an electric, hydraulic or pneumatic motor, or any other suitable actuator. This embodiment permits stepless, smooth control from low bias to an effectively locked position.

The toggle geometry and structure in the second embodiment is identical to that in the first embodiment. Adverting to FIGS. 21A and 21B, the control rings may move over the entire range of the toggles as in the first embodiment. In addition, and as specifically shown in FIGS. 21A and 21B, the cam assembly is capable of expanding the control rings outwardly to engage surfaces 61A and 61B of toggles A and B, respectively, which is not possible in the first embodiment. This position results in maximum locking effect of the differential. The toggles are not allowed to pivot in this position, and the planet gears are held into solid contact (very tight mesh) with the side gears, as shown schematically in FIGS. 21A and 21B.

Thus, it is seen that the second embodiment of the present invention permits external control of the torque bias ratio of a parallel axis differential.

Therefore, while two embodiments of the invention have been shown and described, and several modifications thereof have been shown and described, and several modifications thereof discussed, persons skilled in this art will readily appreciate that various additional changes and modifications may be made without departing from the spirit of the invention, as defined and differentiated by the following claims.

What is claimed is:

1. A parallel-axis gear differential comprising:

a housing rotatable in forward and reverse drive directions about a common axis of rotation of a pair of drive shafts;

first and second side gears positioned within said housing for receiving ends of the respective drive shafts for rotation therewith about said common axis;

first and second pairs of planet gears positioned within said housing in engagement with said side gears for rotation about respective axes that extend parallel to said common axis of rotation;

each of said pairs of planet gears including a leading planet gear member and a following planet gear member;

said leading planet gear member being angularly advanced in said forward drive direction about said common axis with respect to said following planet gear member of each pair;

a first toggle having first and second bearing surfaces and being mounted in said housing between said first and second pairs of planet gears;

said first bearing surface of the first toggle rotationally supporting said leading member of the first pair of planet gears;

said second bearing surface of the first toggle rotationally supporting said following member of the second pair of planet gears;

said first toggle being pivotable about a first pivot axis that extends parallel to said planet gear axes for transmitting a gear reactionary force between said leading and following members of the first and second pairs of planet gears; and, means for controlling said first toggle and for controlling the amount of said gear reactionary force transmitted between said leading and following members of the first and second pairs of planet gears.

2. The differential as recited in Claim 1 wherein said first toggle comprises a first arm and a second arm and a support column between said arms, wherein said support column functions as a pivot point, and wherein each of said arms has a generally cylindrically shaped first outer surface at each longitudinal end of said arm, each of said arms also having one or more frusto-conical ramps which slope downwardly from said first outer surface to a generally cylindrically shaped second outer surface.

3. The differential as recited in Claim 2 wherein said means for controlling said first toggle and for controlling the amount of said gear reactionary force transmitted between said leading and following members of the first and second pairs of planet gears comprises a pair of annular rings connected by a compression spring, wherein said annular rings are operatively arranged to move up and down said ramps in reaction to transmission of said gear reactionary force, where inner surfaces of said rings selectively contact outer surfaces of said toggle to resist and control toggling of said toggle.

4. The differential as recited in Claim 2 wherein said means for controlling said first toggle and for controlling the amount of said gear reactionary force transmitted between said leading and following members of the first and second pairs of planet gears comprises a pair of annular rings which surround said toggle and are operatively arranged to be moved by external means up and down said ramps to control toggling of said toggle, wherein inner surfaces of said rings selectively contact outer surfaces of said toggle.

5. The differential as recited in Claim 4 wherein said external means comprises a pair of control hoops connected to said rings and operated by a cam.

6. The differential as recited in Claim 4 wherein said control rings are operatively arranged to be positioned over and in contact with said first outer surface of said toggle, in which position said leading and following gears are forced into a tight mesh with said side gears, thereby effectively locking said differential.

7. The differential as recited in Claim 1 in which said first toggle applies a braking force to said leading member of the first planet gear pair in response to transmission of torque in the forward drive direction and applies a braking force to said following member of the second planet gear pair in response to transmission of torque in the reverse drive direction.

8. The differential as recited in Claim 7 in which both said leading member of the first pair of planet gears and said following member of the second pair of planet gears mesh with said first side gear.

9. The differential as recited in Claim 7 in which said leading members of the first and second pairs of planet gears mesh with said first side gear.

10. The differential as recited in Claim 1 further comprising a second toggle, a third toggle and a fourth toggle, and a third pair and a fourth pair of planet gears, each pair having leading and following members, wherein said first and third toggles are positioned diametrically opposite one another, and said second and fourth toggles are positioned diametrically opposite one another, and wherein each toggle is positioned between two pairs of planet gears about the circumference of the differential.

11. The differential as recited in Claim 10 in which each toggle has a first bearing surface rotationally supporting a leading member of one planet gear pair and a second bearing surface rotationally supporting a following member of an adjacent planet gear pair, and each toggle is pivotable about an axis that extends parallel to said planet gear axes.

12. The differential as recited in Claim 2 wherein said first arm and said second arm are identical.

13. The differential as recited in Claim 10 wherein said first and third toggles are identical and said second and fourth toggles are identical.

* * * * *

UNITED STATES PATENT AND TRADEMARK OFFICE
CERTIFICATE OF CORRECTION

PATENT NO. : 5,462,497
DATED : October 31, 1995
INVENTOR(S) : Joseph E. Cilano

It is certified that error appears in the above-indentified patent and that said Letters Patent is hereby corrected as shown below:

After item [76] insert the following:

Item [73], Assignees should appear on page one, column one, row three

"Zexel Torsen, Inc.
Rochester, NY".

Signed and Sealed this

Eighth Day of October, 1996

*Attest:*

BRUCE LEHMAN

*Attesting Officer*    Commissioner of Patents and Trademarks